June 19, 1962 — J. R. FOSTER — 3,039,519
TIRE HANDLING MACHINE
Filed March 27, 1961 — 3 Sheets-Sheet 1

INVENTOR.
JAMES R. FOSTER
BY Lowell & Henderson
ATTORNEYS.

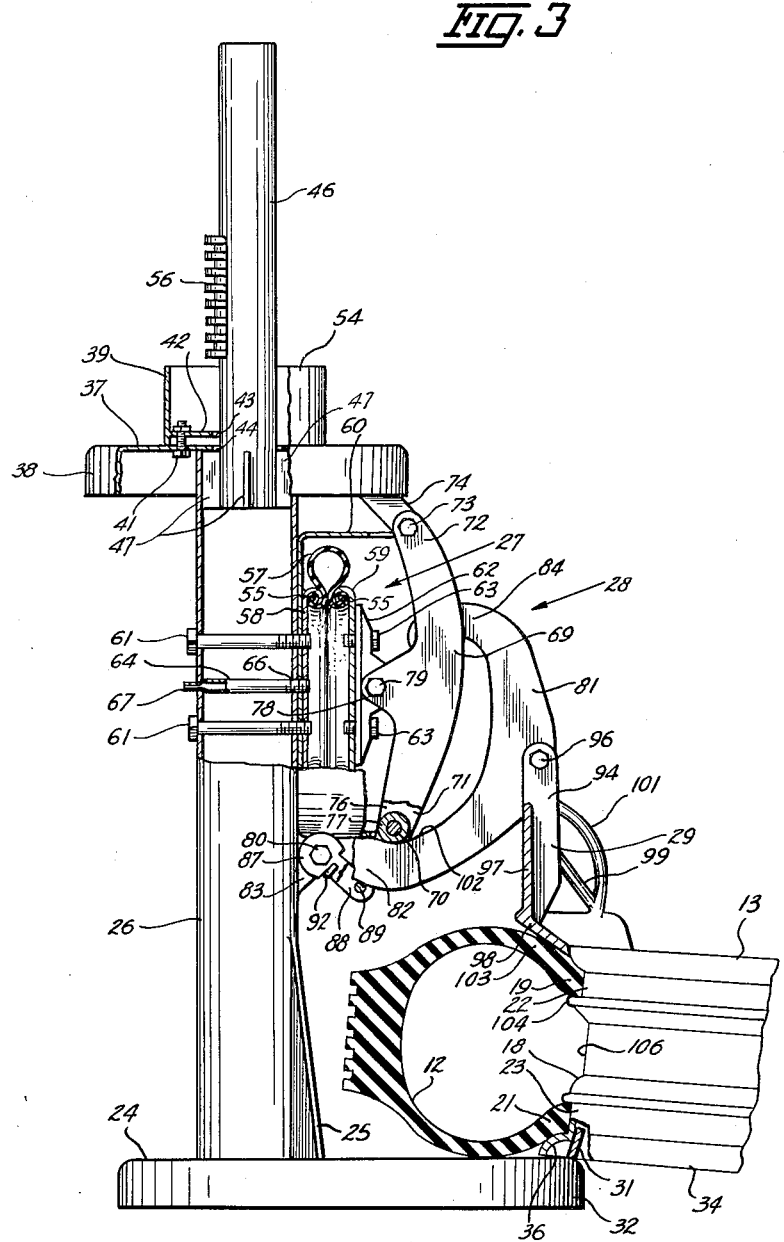

June 19, 1962
J. R. FOSTER
3,039,519
TIRE HANDLING MACHINE
Filed March 27, 1961
3 Sheets-Sheet 3
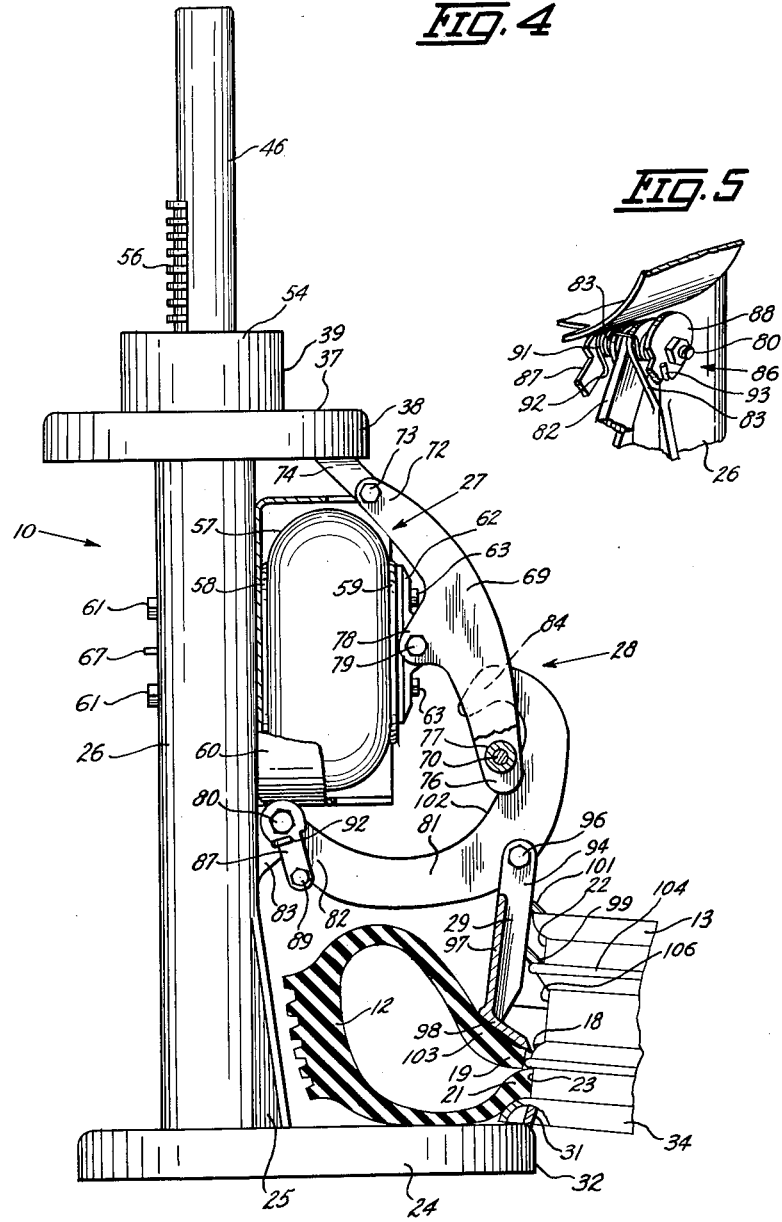
INVENTOR.
JAMES R. FOSTER
BY Lowell & Henderson
ATTORNEYS.

United States Patent Office 3,039,519
Patented June 19, 1962

3,039,519
TIRE HANDLING MACHINE
James R. Foster, Fort Dodge, Iowa, assignor to The Coats Company, Inc., Fort Dodge, Iowa, a corporation of Iowa
Filed Mar. 27, 1961, Ser. No. 98,675
4 Claims. (Cl. 157—1.26)

This invention relates generally to tire handling apparatus and more particularly to a machine for moving a bead of a pneumatic tire out of engagement with a complementary portion of the rim of a wheel for the tire.

An object of this invention is to provide an improved machine for breaking the bead of a pneumatic tire away from engagement with a complementary rim portion of a wheel for the tire.

A further object of this invention is to provide a tire bead breaking machine wherein by merely resting a vehicle tire and wheel assembly on the base of the machine, the assembly is properly positioned for operation of the machine to break away the tire bead from the wheel rim.

Another object of this invention is to provide a fluid actuated power apparatus for breaking away the bead of a vehicle tire from the wheel rim.

Yet another object of this invention is to provide a tire bead breaking machine employing a pneumatically inflatable member for actuating articulated linkage to force a shoe member against a tire casing whereby to break the bead thereof away from an associated wheel rim.

Still another object of this invention is to provide a tire bead breaking machine which is simple in construction, economical to manufacture, and efficient in operation.

Further objects, features and advantages of this invention will become apparent from a consideration of the following description, when taken in connection with the accompanying drawings, wherein:

FIG. 3 is an enlarged side elevational view of the machine in combination with a tire and wheel assembly, and showing the relative positions of the parts at the beginning of the thrust stroke of the machine, with certain parts shown in section and others broken away for illustrative clarity;

FIG. 4 is a view similar to FIG. 3, and showing the relative positions of the parts at the end of the thrust stroke of the machine; and FIG. 5 is an enlarged fragmentary perspective view of a detail of the machine.

Figure 1:
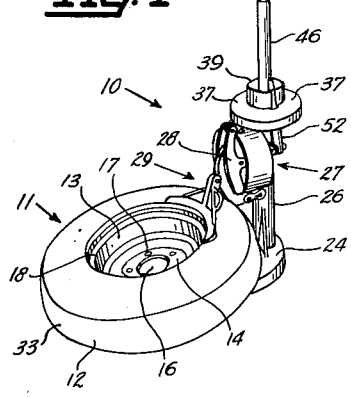
FIG. 1 is a perspective view of the tire bead breaking machine of this invention in assembled relation with a tire and wheel assembly.

With reference to the drawing, the tire bead breaking machine of this invention, indicated generally at 10, is shown in FIG. 1 in assembled relation with a tire and wheel assembly 11 which includes a pneumatic tire 12, of tubeless type, carried on a wheel 13 of the drop-center type. The wheel 13 includes the usual hub portion 14 having a central opening 16, lug receiving apertures 17 arranged about the center opening 16, and a peripheral rim 18 of irregular shape. The tire beads 19 and 21 seat on complementary shaped portions 22 and 23 respectively, of the rim 18 in the assembly of the tire 12 with the wheel 13. The machine 10 is of a size to handle conventional vehicular wheels for fourteen, fifteen, and sixteen inch tires.

In general, the elements of the machine 10 with which this invention is concerned comprise a circular base 24 adapted to be securely fastened to a floor surface, a central tubular standard 26 secured to and projected upwardly from the base 24, a pneumatic power unit 27 mounted on the standard 26 and adapted to exert a thrust laterally of the standard, and an articulated linkage arrangement 28 adapted to receive and transmit the thrust from the power unit 27 to a bead breaker or shoe member 29.

The base 24 has a projection 31 (FIG. 2) mounted adjacent an edge 32 of the base 24, and which projection 31 is included upwardly in a direction away from the base. By the provision of the projection 31, the tire and wheel assembly 11 can be laid with one side 33 (FIG. 1) on the floor (not shown), and with the other side 34 (FIG. 3) resting on the base 24. As illustrated in FIG. 3, the projection 31 engages the interior surface 36 of the wheel rim 18 and thereby, in conjunction with the base 24, supports the wheel 13 of the assembly 11 against downward and lateral movement away from the standard 26.

The standard 26, mounted at a centrally offset position on the base 24, is provided with braces 25 for structural stability on the base 24. Mounted on top of the standard 26 is a circular table 37 (FIG. 2) which includes a peripheral downwardly extended flange 38. The table 37 functions as a laterally extended support on the standard 26. A circular collar 39 (FIG. 3), smaller in diameter than the table 37, is mounted centrally on the table 37 and is attached by means of a plurality of bolts 41 arcuately spaced about the table 37 for engagement with a panel 42 integral with the collar 39 and spaced above the table 37. Both the panel 42 and the table 37 are provided with center openings 43 and 44, respectively, through which a center post 46 extends. The center post 46 (FIG. 3) is provided with a plurality of radial bearing members 47 at its base which rest against the internal surface of the standard 26.

The table 37 is provided with an opening 49 (FIG. 2) offset from the center and through which the extensible outer portion 51 of a dowel unit 52 extends, the unit 52 being pivotally secured to ears 53 carried on the standard 26 below the table 37. By the provision of the collar 39, the table 37 can be utilized as a support for the tire and wheel assembly 11 in mounting and demounting the tire 12 relative to the wheel 13. For this purpose the assembly 11 is placed over the center post 46 so that the hub portion 14 of the assembly 11 rests upon the collar 39, and with the extensible portion 51 of the dowel unit 52 inserted through an aperture 17 of the assembly 11. A wheel clamping unit (not shown) is threaded on the center post 46 by means of a threaded rack 56 formed thereon. A detailed description of the utilization of such a clamping unit is set forth in U.S. Patent No. 2,895,519 issued July 21, 1959 to Gilbert E. Coats.

The power unit 27 includes a circular inflatable member 57 (FIG. 3) of a resilient fabric material having inner peripheral beads 55 which are securely crimped by the periperal curved flanges of a pair of vertically disposed, parallel plates 58 and 59. The inner plate 58 is secured by cap screws 61 to the standard 26, and the outer plate 59 is secured to a clevis member 62 by cap screws 63. A circular shield 60, open at the front, encircles the member 57 and is also secured to the standard 26 by the cap screws 61.

As illustrated in FIG. 3, a tubular air inlet 64 is inserted through the standard 26 and plate 58 so that a threaded end 66 is in communication with the interior of the inflatable member 57, and with a nozzle end 67 exposed on the opposite side of the standard. The nozzle 67 is adapted to be coupled to an air hose (not shown) for the purpose of transmitting pressurized air through the air inlet 64 to inflate the member 57. By such inflation, the inflatable member 57 expands as indicated in FIG. 4 whereby the clevis 62 is laterally moved from a position closely spaced from the standard 26, as illustrated in FIG. 3, to a position further spaced from the standard 26, as illustrated in FIG. 4. The movement of the clevis 62 therefore amounts to a horizontally disposed thrust that is exerted laterally of the standard 26.

The articulated linkage 28 includes a curved lever unit 68 (FIG. 2) which comprises a pair of vertically disposed, parallel spaced levers 69 and 71. The upper end 72 of the lever unit 68 is pivotally connected by a pivot bolt 73 to an ear 74 integral with the flange 38 of the table 37. The lower end 76 of the lever unit 68 is provided with a roller 77 disposed between the levers 69 and 71, and mounted on a bolt 70 (FIG. 1) carried on the levers. Intermediate the ends 72 and 76 of the lever unit 68, both levers 69 and 71 are formed with projections 78 extended toward the standard 26. The projections 78 are pivotally connected to the clevis 62 by a pivot bolt 79.

By this arrangement, it may readily be appreciated that the lever unit 68 is pivotally connected at its upper end 72 to the standard 26 via the table 37, and is also pivotally connected intermediate its ends to the power unit 27 for receiving a thrust therefrom and for transmitting the thrust in a manner described hereinafter, in a bead breaking operation.

The articulated linkage 28 includes also a curved arm 81 (FIG. 2) the lower end 82 of which is pivotally connected by a pivot 80 between a pair of ears 83 (FIG. 5) formed on the standard 26. The remainder of the arm 81 curves upwardly and toward the lever unit 68 with its concave side facing the standard 26. The upper end 84 of the arm 81 is of a hook shape and is inserted between the levers 69 and 71. To bias the arm 81 toward the lever unit 68, a bias unit 86 (FIGS. 2 and 5) is provided which comprises a pair of rock arms 87 and 88 pivotally connected on the pivot bolt 80 to each side of the ears 83. The outer ends of the rock arms 87 and 88 are interconnected by a pin 89 (FIG. 2) beneath the lower end 82 of the arm 81. A coil spring 91 (FIG. 5) mounted on the bolt 80 to both sides of the ear 83 has a pair of free ends 92 and 93 which are locked beneath the rock arms 87 and 88, respectively, so as to bias them upwardly toward the arm 81. By this arrangement, the pin 89 is continually urged against the under surface of the arm 81 and urges the arm 81 toward the lever unit 68.

The shoe member 29 (FIG. 2) includes a pair of spaced, parallel supporting shanks 94 the upper ends of which are connected by a pivot 96 to the arm 81. The shanks 94 are spaced apart by a spacer bar 97 and have their lower ends connected, as by welding, to a curved elongated shoe 98. The shoe 98 is of a curvature which corresponds substantially to the curvature of the peripheral rim 18 of the wheel 13, and as best illustrated in FIG. 3, the shoe 98 is inclined toward the wheel 13 when disposed vertically from the arm 81. The shoe 98 has its end portions braced by rods 99 connected to the shanks 94. A curved member 101 on one of the rods 99 acts as a handle for manually positioning the shoe member 29 relative to the wheel and tire assembly 11.

Figure 2:
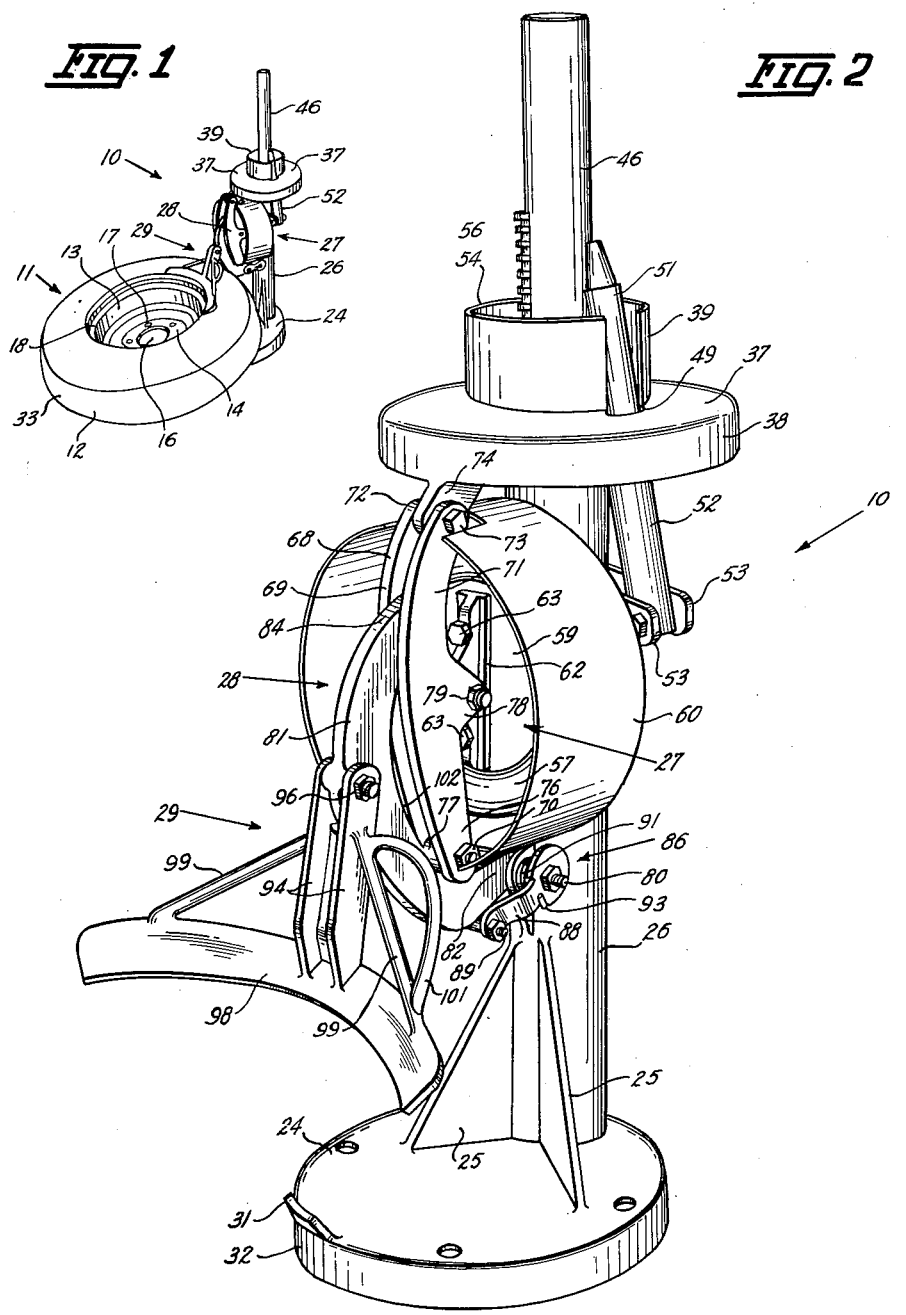
FIG. 2 is an enlarged perspective view of the tire bead breaking machine.

In the operation of the machine 10 to break or move the upper and lower tire beads 19 and 21, respectively, out of engagement with their respective rim portions 22 and 23, assume the machine to be in the inoperative or rest position shown in FIGS. 2 and 3. The tire and wheel assembly 11 rests on the machine base 24 and is secured against downward and lateral movement away from the standard 26 by means of the base projection 31 (FIG. 3). It will be noted in this position that the inflatable member 57 is completely deflated, and that the roller 77 at the lower end 76 of the lever unit 68 engages the inner concave surface 102 of the arm 81 due to the action of the bias unit 86 in forcing the arm 81 upwardly and toward the lever unit 68. The shoe member 29, depending upon the size of the tire 12, either depends freely from its pivot 96 or is placed upon the tire wall 103 adjacent the upper bead 19. Should it be necessary to manipulate the shoe member 29, such may readily be done by using the handle 101.

Upon the application of pressurized air through the air inlet 64, the inflatable member 57 forces the clevis 62 laterally away from the standard 26. In so doing, the thrust of the power unit 27 is received by the lever unit 68 which pivots in a counter-clockwise direction (FIG. 3) about the pivot 73 wherein the lower end 76 of the unit 68 travels outwardly and away from the standard 26 in an arcuate path. The roller 77 at the lower end 76 of the lever unit 68 is therefore moved along the inner surface 102 of the arm 81. Since the roller 77 travels in a fixed path, the arm 81 is forced to pivot about its pivot bolt 80 in a clockwise direction (FIG. 3) and against the bias of the spring 91.

This actuation of the lever unit 68 and the arm 81, which comprise the articulated linkage 28, causes the shoe 98 of the shoe member 29 to be forced downwardly against the upper side wall 103 of the tire 12 (FIG. 3). As the inflation of the member 57 continues, the downward movement of the shoe 98 also continues and results in breaking the upper tire bead 19 away from the complementary rim portion 22 and so that the bead 19 rolls over the rim projection 104 (FIG. 3) to a position on the rim 18 inwardly of the projection 104.

When the member 57 reaches the final extent of its inflation (FIG. 4) the lateral movement of the clevis 62 has caused the lever unit 68 to pivotally move to the extent that the roller 77 is closely adjacent the upper end 84 of the arm 81. In one embodiment of the machine, a two and one-half inch lateral movement of the clevis 62 results in a substantially vertical downward movement of approximately six inches by the shoe member 29. As the end 84 of the arm 81 is hook shaped, the relative movement of the lever unit 68 and the arm 81 is limited in that the hooked end 84 will engage the roller 77 and in so doing prevent further relative movement between the arm 81 and lever unit 68.

In the final position of the power unit 27 (FIG. 4) the upper bead 19 is moved completely away from the rim portion 22 to a position within the drop-center area 106 of the rim 18. Thus during the entire upper bead breaking operation, the shoe 98, in rolling and moving the upper bead 19 away from the rim portion 22, contacts the upper side wall 103 at a position adjacent the bead 19.

The arcuate extent of the upper bead 19 which is broken away from the rim portion 22 by the operation is generally sufficient to break the entire bead 19; however, if such is not the case, upon removal of the pressurized air source from the air inlet 64, the member 57 deflates and pivots the lever unit 68 clockwise (FIG. 4) back to its FIG. 3 position. This permits the bias unit 86 to raise the arm 81 and thus lift the shoe 98 away from the tire 12. The assembly 11 can then be rotated in place until the shoe 98 is above an unbroken portion of the upper bead 19, whereupon the above describd operation is repeated. To break the lower bead 21 away from its complementary rim portion 23, the assembly 11 is turned over, placed on the base 24 as described hereinbefore, and the machine 10 operated as described relative to the upper bead 19.

From the above description, it is seen that this invention provides a tire bead breaking machine of an extremely simple construction for pneumatically breaking the uppermost bead of a tire and wheel assembly rested partially on the base of the machine.

Although a preferred embodiment of the invention has been described herein, it is not to be so limited as various modifications and changes can be made therein which are within the full intended scope of the invention as defined by the appended claims.

I claim:

1. Tire handling apparatus for breaking a tire bead from a complementary rim portion of a tire and wheel assembly comprising a frame including a base device adapted to support the wheel of the assembly against downward and lateral movement, said frame including further an upright standard mounted on said base, power means mounted on said standard for exerting a lateral thrust in one direction away from said standard, articulated means pivotally connected to said frame and to said thrust means for receiving and transmitting said thrust in a direction toward said base, and bead breaking means pivotally connected to said articulated means, said bead breaking means including a shoe member adapted to engage the tire bead adjacent the complementary rim portion and to break the bead therefrom upon the application thereto of said transmitted thrust.

2. Tire handling apparatus for breaking a tire bead from a complementary rim portion of a tire and wheel assembly comprising a frame having a base, means on said base for supporting the wheel of said assembly against downward and lateral movement away from said base, an upright standard mounted on said base, power means mounted on said standard for exerting a thrust in one direction laterally from said standard, articulated means for receiving and transmitting said thrust in a downward direction including a pair of arcuately shaped arm members one of which is pivotally mounted at one end on said frame above said power means and engageable intermediate the ends thereof by said power means, the other member being pivotally mounted at one end on said frame below said power means and extended upwardly from said one end thereof, said one member having a portion at the other end thereof movably engageable with said other member and movable longitudinally thereof upon operation of said power means whereby to pivotally move said other member, means on said frame for biasing said other member into an engaged position with said portion, and bead breaking means pivotally connected to said other member intermediate the ends thereof and including a shoe member adapted to engage the tire bead adjacent the complementary rim portion and to break the bead therefrom upon operation of said power means.

3. Tire handling apparatus for breaking a tire bead from a complementary rim portion of a tire and wheel assembly comprising a frame including a base, means mounted on said base for supporting the wheel of the assembly against downward and lateral movement away from said base, an upright standard mounted on said base, power means mounted on said standard for exerting a thrust upon operation thereof, an arcuately shaped first lever having spaced ends and a bifurcated portion intermediate said ends pivotally connected to said power means, said lever having one end pivotally connected to said frame to one side of said power means whereby the other end of said lever moves through an arc upon operation of said power means, a second arcuately shaped lever pivotally connected at one end thereof to said frame to the other side of said power means and extended toward the one end of said first lever, said first lever having a portion at the other end thereof movably engageable with a side edge of said second lever and adapted upon operation of said power means to pivotally move said second lever, means on said frame for yieldably holding said second lever in an engaged position with said portion, and bead breaking means pivotally connected to and movable with said second arcuately shaped lever, said bead breaking means including a shoe member adapted to engage and break away the tire bead from the complementary rim portion, upon operation of said power means.

4. Tire handling apparatus for breaking a tire bead from a complementary rim portion of a tire and wheel assembly comprising a frame including a base, means mounted on said base for supporting the wheel of the assembly against downward and lateral movement away from the base, an upright standard mounted on said base, power means including an inflatable member having one side supported on said standard, said member having another side movable laterally away from said standard upon inflation of said member whereby to exert a thrust thereby, a clevis attached to said laterally movable side, lever means including a pair of parallel, spaced levers having opposed, connected ends, said levers being pivotally connected intermediate said ends to said clevis and extending parallel to said standard, one of said ends being pivotally connected to said standard above said power means whereby the lateral thrust movement of said clevis results in pivotal movement of said lever means and arcuate movement of its free end, a roller at the free end of said lever, an elongated arcuate arm having one end portion pivotally connected to said standard below said power means and extending upwardly with its concave edge facing said lever means and engaging said roller, the other end portion of said arm extending between said spaced levers, means connected to said standard and biasing said arm into engagement with said roller, said arm movable pivotally downwardly toward said base in response to movement of said lever means, and bead breaking means including a shoe pivotally mounted on said arm for positive free translatory movement in response to movement of said arm, said shoe adapted to engage the tire bead closely adjacent the rim portion and to break away the tire bead therefrom upon inflation of said member.

References Cited in the file of this patent

UNITED STATES PATENTS

| | | |
|---|---|---|
| 2,212,768 | Bonneau | Aug. 27, 1940 |
| 2,449,960 | Toles | Sept. 21, 1948 |
| 2,536,139 | Ritter | Jan. 2, 1951 |
| 2,612,214 | Zang | Sept. 30, 1952 |
| 2,808,860 | Hildebrant | Oct. 8, 1957 |
| 2,837,147 | Henderson et al. | June 3, 1958 |
| 2,962,065 | Moore | Nov. 29, 1960 |
| 2,978,017 | Schultz et al. | Apr. 4, 1961 |